(12) United States Patent
 Carman et al.

(10) Patent No.: US 8,769,333 B2
(45) Date of Patent: *Jul. 1, 2014

(54) APPLICATION RELIABILITY AND FAULT TOLERANT CHIP CONFIGURATIONS

(75) Inventors: Jay W. Carman, Austin, TX (US); Anshuman Khandual, Austin, TX (US); Jyotindra Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/458,802

(22) Filed: Apr. 27, 2012

(65) Prior Publication Data

US 2012/0216068 A1   Aug. 23, 2012

Related U.S. Application Data

(63) Continuation of application No. 13/006,231, filed on Jan. 13, 2011, now Pat. No. 8,539,284.

(51) Int. Cl.
 *G06F 11/00*      (2006.01)
(52) U.S. Cl.
 USPC ............................................................ 714/1

(58) Field of Classification Search
 USPC ............................................................ 714/1
 See application file for complete search history.

(56) References Cited

U.S. PATENT DOCUMENTS

| | | |
|---|---|---|
| 4,975,882 A | 12/1990 | Kuo et al. |
| 5,717,872 A | 2/1998 | Whittaker |
| 5,819,305 A | 10/1998 | Nixon |
| 6,687,194 B1 | 2/2004 | Kobayashi et al. |
| 6,892,283 B2 | 5/2005 | Arimilli et al. |
| 6,950,885 B2 | 9/2005 | Shah |
| 2005/0273548 A1 | 12/2005 | Roohparvar |
| 2012/0185733 A1 | 7/2012 | Carman et al. |

*Primary Examiner* — Bryce Bonzo
(74) *Attorney, Agent, or Firm* — DeLizio Gilliam, PLLC

(57) ABSTRACT

An application can specify reliability values via a communication path between the application and the registers. Application reliability could increase if the application itself could specify the timeout and retry values. For instance, some errors might be prevented if the timeout value is lengthened by a short amount. A longer timeout value would result in slower performance because the memory component could not be accessed during the timeout period. However, resolving errors in memory devices would prevent unrecoverable error indicators from being returned to the application, which would in turn limit application and system crashes. Creating a communication path between the application and the hardware registers would allow the application to modify the reliability of memory operations.

11 Claims, 4 Drawing Sheets

APPLICATION RELIABILITY AND FAULT TOLERANT CHIP CONFIGURATIONS

RELATED APPLICATIONS

This application claims the benefit under 35 U.S.C. §120 of U.S. patent application Ser. No. 13/006,231 filed on Jan. 13, 2011.

BACKGROUND

Embodiments of the inventive subject matter generally relate to the field of application reliability, and, more particularly, to chip configurations for application reliability and fault tolerance.

Applications frequently use operating systems to send instructions to hardware devices. The communication between the operating systems and hardware devices allows for the applications to read and write data to memory components. Occasionally, there are errors in the memory components when the memory instructions are executed. These errors can occur for many reasons. For instance, parity errors can occur when data read from memory has been corrupted. Software embedded in the hardware device (also referred to herein as "firmware") can detect the parity error by analyzing the bit values of the data read from memory and determining that one or more values of the bits have changed. Once a parity error has been detected, the firmware can attempt the read operation again before returning an unrecoverable error message to the application.

SUMMARY

Embodiments include a method for an executing instance of firmware to set an initial reliability value in a register of a memory controller. An executing instance of an application then invokes a function that sets an application specific reliability value for the application in the register of the memory controller, wherein the application specific reliability value is programmed into the application. The application specific reliability value is then written into the register of the memory controller responsive to said invoking the function that sets the application specific reliability value.

Embodiments also include a method for setting an initial reliability value in a register of a memory controller during an initial boot process of a computer system. The initial reliability value in the register of the memory controller is then overwritten with an application specific reliability value in response to an application request to set the application specific reliability value for the application.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
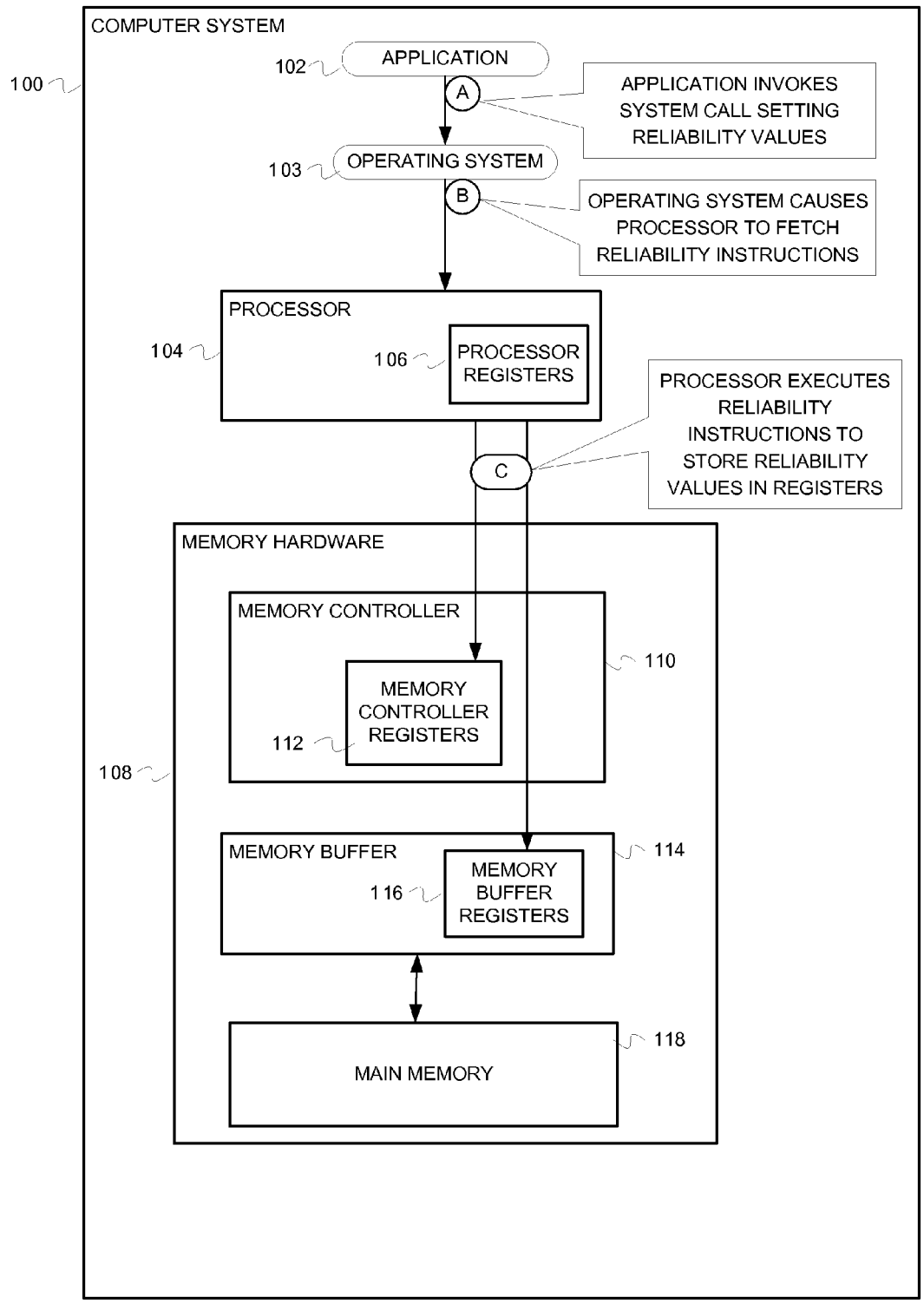
FIG. 1 depicts an example conceptual diagram of a processor modifying chip configurations for application reliability and fault tolerance.

The description that follows includes example systems, methods, techniques, instruction sequences and computer program products that embody techniques of the present inventive subject matter. However, it is understood that the described embodiments may be practiced without these specific details. For instance, although examples refer to executing instructions in memory components, the inventive subject matter could also be used to improve reliability for executing instructions in other hardware devices. In other instances, well-known instruction instances, protocols, structures and techniques have not been shown in detail in order not to obfuscate the description.

Currently, timeout and retry values (reliability values) are stored in registers that reside in hardware devices. The timeout and retry values are written in the hardware registers during the in initial boot process (also referred to herein as "Initial Program Load"). Once the reliability values have been written in the hardware registers, the reliability values will remain static. In other words, the reliability values cannot be modified by an application or operating system. The hardware registers are modified by the firmware on hardware, which is executed during the initial boot process An application may execute a memory read through the operating system. The operating system will send the instruction to the processor, where the instruction is decoded and the memory read is attempted from the memory device. If an error occurs in the memory device during the execution of a read instruction, then the timeout values and retry values loaded during the initial boot process will be used during the subsequent attempts to execute the read instruction. If the memory error is not corrected within a time period specified by the timeout value, then the memory device returns an unrecoverable error indication. This unrecoverable error is passed through the operating system to the application. The application can stop functioning properly at this time, which could lead to the entire operating system crashing.

Adapting reliability values to different applications, which have different tolerances for timeouts and/or retries, avoids constraining all applications on a system to a same set of reliability values. For example, some applications might contain function calls that are unreliable. In other words, certain function calls may have a higher probability of resulting in an unrecoverable error being returned to the application. In order to prevent an unrecoverable error indicator being returned, the application could adjust the reliability values in the hardware's registers. By increasing the timeout values retry values used for correcting errors, the errors might be resolved. This would prevent the application from crashing.

An application can specify reliability values via a communication path between the application and the registers that host the reliability values. The application reliability issue could be prevented if the application itself could specify the timeout and retry values. For instance, some errors might be prevented if the timeout value is lengthened by a short amount. A longer timeout value would result in slower performance because the memory component could not be accessed during the timeout period. However, resolving errors in memory devices would prevent unrecoverable error indications from being returned to the application, which would in turn limit application and system crashes. Creating a communication path between the application and the hardware registers allows the application to modify the reliability of memory operations.

FIG. 1 depicts an example conceptual diagram of a processor modifying chip configurations for application reliability and fault tolerance. Computer system 100 includes application 102, operating system 103, processor 104, and memory hardware 108. Processor 104 includes processor registers 106. Memory hardware 108 includes memory controller 110, memory buffer 114, and main memory 118. Memory controller 110 includes memory controller registers 112 and memory buffer 114 includes memory buffer registers 116.

Main memory 118 stores data, while memory controller 110 retrieves the data stored in main memory 118 for processor 104. Memory buffer 114 temporarily stores data as the data is transferred from main memory 118 to memory controller 110.

Application 102 is comprised of a set of instructions, which perform application's 102 tasks. The set of application instructions is first written as source code. The source code contains application's 102 instructions in a computer programming language (e.g., C, Visual Basic, etc.) format. Before processor 104 can execute the source code, application's 102 instructions are converted from a computer programming language format to a format processor 104 can execute (machine-executable format). A compiler uses compiler directives to convert the source code from a computer programming language format into a machine-executable format. In order to set reliability values in the memory components, the compiler uses additional compiler directives. The additional compiler directives allow the compiler to convert application's 102 instructions that set reliability values in registers in the memory components to a machine-executable format.

Application 102 invokes a system call for setting reliability values (Stage A). The reliability values include both timeout and retry values. The timeout values specify a period of time for memory controller 110 and memory buffer 114 (also referred to herein as "memory components") to correct errors. For instance, if an error is encountered in the memory components while performing an instruction, the timeout value would specify a period of time to wait before returning an error indicator. The retry values specify the number of attempts to use while correcting errors in memory components before returning an error indicator.

The application can choose various increased levels of reliability. As a higher level of reliability is selected, the application's performance may decrease because an increased amount of time will be used to correct errors during application execution. A particular level of reliability can be invoked for specific instructions within the application. In other words, an application can increase the reliability level before executing a set of the application's instructions. In other instances, the reliability level can be increased for the execution of all the application's instructions. Some embodiments may limit the level of reliability for instructions that detect user feedback. Once the application is terminated, operating system 103 will reset the reliability values to the reliability values initiated during the initial boot process.

Operating system 103 causes processor 104 to fetch the reliability instructions (Stage B) by providing processor 104 with the memory addresses for the reliability instructions. Processor 104 then decodes the reliability instructions by loading any references in the reliability instructions into processor registers 106.

Processor 104 then executes the reliability instructions to store reliability values in registers in memory components (Stage C). Since the reliability instructions are included in the application's instructions, processor 104 executes the reliability instructions while executing application's 102 instructions. The execution of the reliability instructions results in the reliability values being communicated from processor 104 to the registers in memory components.

In order for processor 104 to set reliability values stored in registers in the memory components, the instruction set architecture (ISA) for processor 104 is modified. The ISA for processor 104 is a set of instructions that processor 104 can execute. An example of an instruction of an ISA is an add instruction that will add the values stored in two registers and place the result in a third register. In order for processor 104 to set the reliability values in registers in the memory components, the ISA includes additional instructions. The additional instructions allow processor 104 to set the reliability values in registers in the memory components by communicating the reliability values directly between processor 104 and the memory components.

Figure 2:
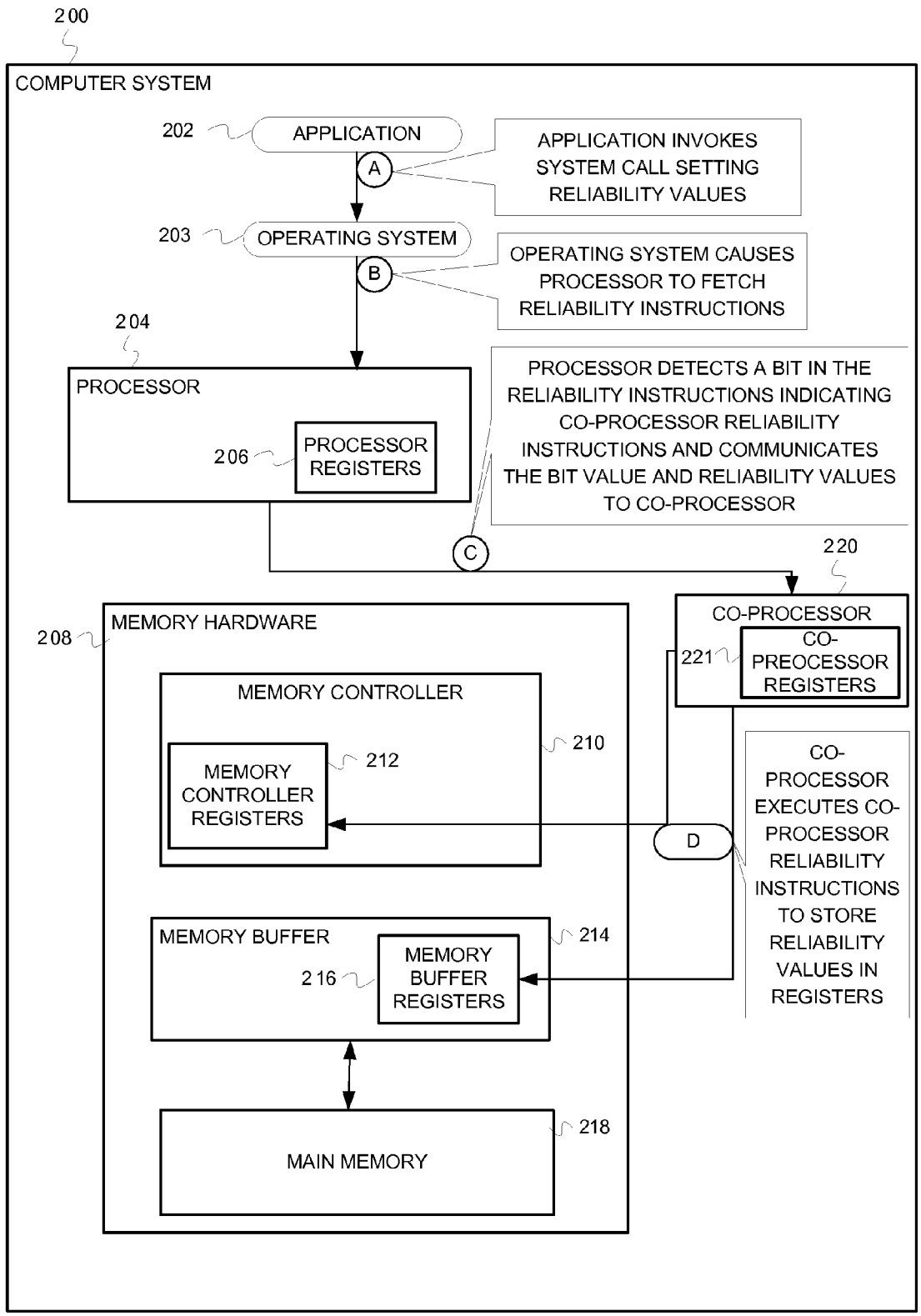
FIG. 2 depicts an example conceptual diagram of a processor modifying chip configurations for application reliability and fault tolerance.

FIG. 2 depicts an example conceptual diagram of a processor modifying chip configurations for application reliability and fault tolerance. Computer system 202 includes application 202, operating system 203, processor 204, memory hardware 208, and co-processor 220. Processor 204 includes processor registers 206. Memory hardware 208 includes memory controller 210, memory buffer 214, and main memory 218. Memory controller 210 includes memory controller registers 212 and memory buffer 214 includes memory buffer registers 216.

Main memory 218 stores data, while memory controller 210 retrieves the data stored in main memory 218 for processor 204. Memory buffer 214 temporarily stores data as the data is transferred from main memory 218 to memory controller 210.

Co-processor 220 manages memory controller registers 212 and memory buffer registers 216. Co-processor 220 includes co-processor registers 221 that can store values.

Application 202 invokes a system call for setting reliability values (Stage A). The reliability values include both timeout and retry values. The timeout values specify a period of time for the memory components to correct errors. For instance, if an error is encountered while performing an instruction in a memory component, the timeout value would specify a period of time to wait before returning an error indicator. The retry values specify the number of attempts to use while correcting errors in hardware components before returning an error indicator.

Operating system 203 causes processor 204 to fetch the reliability instructions (Stage B) by providing processor 104 with the memory addresses for the reliability instructions. Processor 204 then decodes the reliability instructions by loading any references in the reliability instructions into processor registers 206.

Processor 204 then detects an instruction with a bit indicating the instruction is a co-processor reliability instruction (Stage C). Processor 204 communicates the bit value to co-processor 220, which signals co-processor 220 to set reliability values in memory controller registers 212 and memory buffer registers 216. Processor 204 also loads the reliability values referenced in the co-processor reliability instruction into co-processor registers 221.

In order for processor 204 to modify reliability values stored in registers in memory components, the instruction set architecture (ISA) for processor 204 is modified. The ISA includes additional instructions that allow processor 204 to access and modify co-processor's registers 221. The ISA also includes additional instructions that include a bit indicator, which notifies processor 204 that a co-processor reliability value instruction has been received.

Co-processor 220 executes an operating system, which executes a firmware application. The firmware application detects the bit indicator from processor 204, which indicates reliability values should be transmitted to memory controller registers 212 and memory buffer registers 216. The firmware application also includes instructions that set the reliability values of memory controller registers 212 and memory buffer registers 216 (Stage D). Embodiments include, but are not limited to, instructions that set the reliability values in memory controller registers 212 and memory buffer registers 216 via an interface that complies with the IEEE 1149.1-1990 standard. The standard provides for a four or five pin interface added to a chip, such as a co-processor, which allows the chip to directly communicate with other chips in a computer system. Circuitry and instructions that comply with the IEEE 1149.1-1990 standard allow values stored in registers to be communicated between multiple chips. Embodiments are not limited to an interface that complies with IEEE 1149.1-1990 standard.

If an error is encountered in memory controller 210 while executing an instruction, the reliability values stored in memory controller registers 212 can be used to increase the time allowed for error correction. Similarly, if an error is encountered in memory buffer 214 while executing an instruction, the reliability values stored in memory buffer registers 216 can be used to increase the time allowed for error correction.

Figure 3:
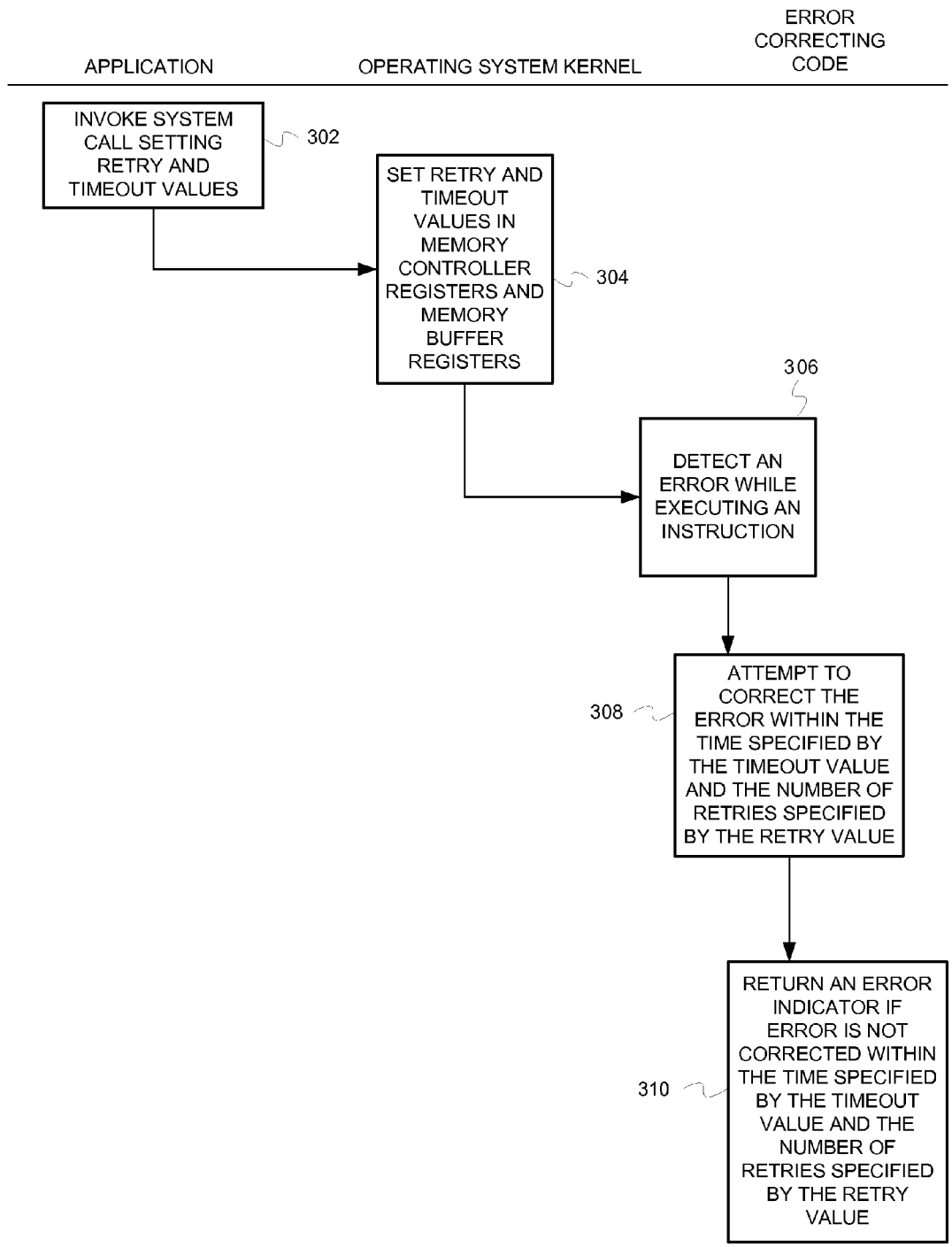
FIG. 3 depicts an example diagram of application reliability values being utilized during error correction.

FIG. 3 depicts an example diagram of application reliability values being utilized during error correction.

An application invokes a system call setting timeout and retry values (reliability values) in registers in memory components (302). Memory components include memory controllers and memory buffers.

An operating system then sets the timeout and retry values in registers in the memory components (304).

An error is then detected in a memory component while executing an instruction (306).

An attempt to correct the error lasts for a time specified in the timeout value and a number of retry attempts specified in the retry value (308). If the error is corrected, then no error indicator is returned.

If the error is not corrected within the time specified in the timeout value and the number of retry attempts specified in the retry value, then an error indicator is returned (310).

An example of modifying reliability values in registers in memory components during execution of an application involves mark store arrays. Mark store arrays contain error information for the cache line (the communication path between main memory and processor). Whenever an error is encountered in the cache line, the bit locations affected by the error in the cache line can be stored in the mark store array for a particular rank in main memory. A rank in main memory refers to a specific memory module that accesses the cache line. Multiple memory modules can use a single cache, but only one module can access the cache line at a time.

The mark store array can occasionally have errors within the array itself. Whenever a parity error is detected in the mark store array, a separate bit in the MCFIR changes value. The MCFIR indicates to the firmware residing in the co-processor that the mark store array has a parity error that should be corrected before memory accesses to the affected rank in main memory can be allowed. The mark store array has a backup stored in a separate location, which the co-processor's firmware can copy to the mark store array itself. The backup copy of the mark store array replaces the corrupted mark store array data and resolves the parity error in the mark store array.

Reliability values can be used to correct parity errors in the mark store array because a timeout value is included in the reliability values. When an application increases the reliability level, the timeout value for error correction increases. The increased timeout value provides sufficient time for the co-processor's firmware to retrieve the copy of the mark store array and replace the corrupted data in the mark store array. While memory accesses are temporarily halted to the particular rank affected by the parity error in the mark store array, an unrecoverable error is averted. Therefore, the application and operating system do not crash.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
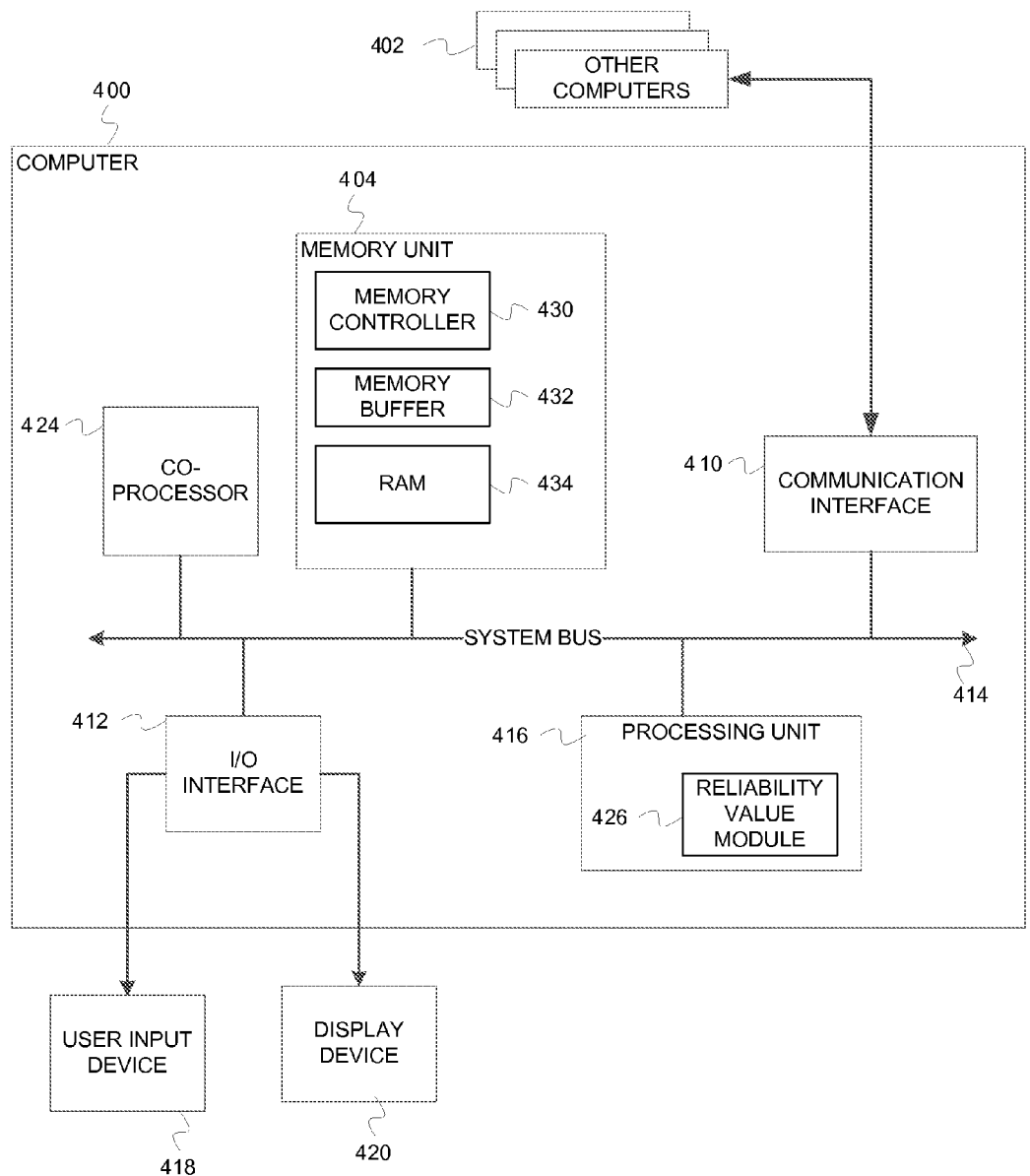
FIG. 4 depicts an example computer system.

FIG. 4 depicts an example computer system. Computer system 400 includes processing unit 416 (possibly including multiple processors, multiple cores, multiple nodes, and/or implementing multi-threading, etc.). Processing unit 416 includes reliability value module 426. Computer system 400 includes memory 404. Memory 404 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Computer system 400 also includes system bus 414 (e.g., PCI, ISA, PCI-Express, HyperTransport®, InfiniBand®, NuBus, etc.), communication interface 410 (e.g., an ATM interface, an Ethernet interface, a Frame Relay interface, SONET interface, wireless interface, etc.), co-processor 424 and I/O (input/output) interface 412. Communication interface 410 allows computer system 400 to communicate (e.g., send and receive data) with other computers 402. Input/output interface adapters in computers can implement user-oriented input/output through, for example, software drivers and computer hardware. I/O interface 412 may utilize various display devices 420, such as computer display screens, and various user input devices 418, such as keyboards and mice.

Reliability value module 426 embodies functionality to implement embodiments described above. Reliability value module 426 may include one or more functionalities that facilitate chip configurations for application reliability and fault tolerance. Some or all of the functionality of the reliability value module 426 may be implemented with code embodied in memory 404 and/or processor 416, co-processor 424, other cards, etc. Any one of these functionalities may be partially (or entirely) implemented in hardware and/or on processing unit 416. For example, the functionality may be implemented with an application specific integrated circuit, in logic implemented in processing unit 416, in co-processor on a peripheral device or card, etc. Further, realizations may include fewer or additional components not illustrated in FIG. 4 (e.g., video cards, audio cards, additional network interfaces, peripheral devices, etc.). Processing unit 416, I/O interface 412, co-processor 424, and communication interface 410 are coupled to system bus 414. Although illustrated as being coupled to the system bus 414, memory 404 may be coupled to processing unit 416.

While the embodiments are described with reference to various implementations and exploitations, it will be understood that these embodiments are illustrative and that the scope of the inventive subject matter is not limited to them. In general, chip configurations for application reliability and fault tolerance as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    setting an initial reliability value, by an executing instance of firmware, in a register of a memory controller;
    invoking, by an executing instance of an application, a function that sets an application specific reliability value for the application in the register of the memory controller, wherein the application specific reliability value is programmed into the application; and
    storing the application specific reliability value into the register of the memory controller responsive to said invoking the function that sets the application specific reliability value.

2. The method of claim 1, wherein said storing the application specific reliability value into the register of the memory controller responsive to said invoking the function that sets the application specific reliability value comprises a processor storing the application specific reliability value into the register of the memory controller responsive to executing a set of machine instructions that implement the function.

3. The method of claim 1, wherein said storing the application specific reliability value into the register of the memory controller responsive to said invoking the function that sets the application specific reliability value comprises the processor requesting a co-processor to store the application specific reliability value into the register of the memory controller, wherein the co-processor is coupled with the memory controller.

4. The method of claim 3, wherein the processor requesting the co-processor to store the application specific reliability value into the set of one or more registers of the memory controller comprises the processor storing the reliability value into a register of the co-processor and causing the co-processor to invoke firmware that stores a value in the register of the co-processor into the register of the memory controller.

5. The method of claim 1, further comprising:
resetting the application specific reliability value to the initial reliability value, by the executing instance of the operating system, after the application terminates.

6. The method of claim 1, wherein the application specific reliability value comprises one of a timeout value and a retry value.

7. A method comprising:
setting an initial reliability value in a register of a memory controller during an initial boot process of a computer system; and
overwriting the initial reliability value in the register of the memory controller with an application specific reliability value in response to an application request to set the application specific reliability value for the application.

8. The method of claim 7, wherein said setting the initial reliability value in a register of the memory controller during the initial boot process of the computer system comprises setting the initial reliability value in the register of the memory controller, by an executing instance of firmware invoked by a co-processor, during the initial boot process of the computer system.

9. The method of claim 7, wherein the application specific reliability value comprises one of a timeout value and a retry value.

10. The method of claim 9, wherein the timeout value indicates a period of time for the memory controller to correct an error and the retry value indicates a number of retries for the memory controller to perform.

11. The method of claim 7 further comprising:
setting a second initial reliability value in a second register of the memory controller during the initial boot process of the computer system; and
overwriting the second initial reliability value in the second register of the memory controller with a second application specific reliability value in response to the application request to also set the second application specific reliability value for the application.

* * * * *